United States Patent [19]
Ruhnau

[11] Patent Number: 5,469,358
[45] Date of Patent: Nov. 21, 1995

[54] METHOD FOR GENERATING WHEEL ACCELERATION CONTROL SIGNALS AND WHEEL DECELERATION CONTROL SIGNALS

[75] Inventor: Gerhard Ruhnau, Neustadt, Germany

[73] Assignee: WABCO Westinghouse Fahrzeugbremsen GmbH, Hanover, Germany

[21] Appl. No.: 229,386

[22] Filed: Apr. 18, 1994

Related U.S. Application Data

[63] Continuation of Ser. No. 738,162, Jul. 30, 1991, abandoned.

[30] Foreign Application Priority Data

Jul. 30, 1990 [DE] Germany ............... 40 24 147.5

[51] Int. Cl.$^6$ ............................................. G01C 23/00
[52] U.S. Cl. ............... 364/426.02; 364/565; 364/424.01; 364/426.01; 180/197; 180/233; 324/162; 303/178
[58] Field of Search ............... 364/426.02, 426.04, 364/424.05, 426.01, 424.1, 426.03, 565, 566; 303/100–109, 90–96; 180/197, 233; 324/162; 244/111

[56] References Cited

U.S. PATENT DOCUMENTS

| | | | |
|---|---|---|---|
| 4,933,858 | 6/1990 | Matsuda | 303/95 |
| 4,984,164 | 1/1991 | Maehara et al. | 303/103 |
| 5,065,327 | 11/1991 | Yahagi et al. | 364/424.01 |
| 5,099,443 | 3/1992 | Higashimata et al. | 364/426.02 |
| 5,280,432 | 1/1994 | Kuwana et al. | 180/197 |
| 5,307,275 | 4/1994 | Okudo | 364/426.02 |

Primary Examiner—Kevin J. Teska
Assistant Examiner—Jacques H. Louis-Jacques
Attorney, Agent, or Firm—Horst M. Kasper

[57] ABSTRACT

A method is provided for the generation of wheel acceleration control signals and wheel deceleration control signals for an anti-lock system for wheels of a vehicle. The vehicle is furnished with a digital electronic anti-lock system with at least one microprocessor. The microprocessor calculates a wheel comparison speed ($v_{diff}$). The wheel comparison speed is obtained by a filtering of the actual wheel speed ($v_{wheel}$), and follows in time to the actual wheel speed ($v_{wheel}$). A deceleration signal (−b) or an acceleration signal (+b), respectively, is then furnished when the absolute value of the difference (Δ) between the wheel comparison speed ($v_{diff}$) and the actual wheel speed ($v_{wheel}$) surpasses a preset value as based on the sign of the difference (Δ).

20 Claims, 4 Drawing Sheets

METHOD FOR GENERATING WHEEL ACCELERATION CONTROL SIGNALS AND WHEEL DECELERATION CONTROL SIGNALS

This is a continuation of application Ser. No. 07/738,162, filed Jul. 30, 1991 now abandoned.

BACKGROUND OF THE INVENTION

1. Field of the Invention

The invention relates to a method for the generation of wheel acceleration and wheel deceleration automatic control signals for an anti-lock system including at least one microprocessor, where the anti-lock system monitors the wheel behavior of one or several vehicle wheels.

2. Brief Description of the Background of the Invention Including Prior Art

It is known with vehicles furnished with an anti-lock system to derive logical signals for the respective wheel behavior from the rotation behavior of the wheels. These signals are in most cases generated digitally for the wheel acceleration (+b), the wheel deceleration (−b), and the wheel slippage (λ). The three signals are combined together in a following logic circuit or by way of a program of a computer. The resulting output signals are amplified in final stages and finally fed to solenoid valves which control the brake cylinders of the individual wheels. It is an object of such an anti-lock system, to prevent a locking of the vehicle wheels by automatically controlling a certain wheel slippage of about 25%, and thus to maintain the steerability of the vehicle in case of an emergency braking as well as to shorten the braking distance. Modern anti-lock systems of the kind recited are furnished with at least one microprocessor and calculate the recited signals by way of a program, compare for example British Patent Document GB-A 2,152,714.

A method is known from the German Printed Patent Document DE-A-2,844,279 for determining the recited acceleration and slippage signals from the rotation behavior of the wheels. The wheels are furnished with toothed Sears which are scanned by rotation speed sensors. The period duration, i.e. the time distance of two neighboring teeth, is determined from the output signals of a wheel sensor while counting of pulses during a period. After division of a constant value by the period duration, there results a digital value, which is proportional to the speed. This process is repeated during each period.

The change of the speed values during a preset time period ($\Delta t$), forming a reference time duration between points in time ($t_0$ and $t_1$), is investigated for forming the wheel acceleration (+b) and wheel deceleration (−b), respectively. If the wheel speed changes during this time period relative to the reference value by at least a reference value ($\Delta v$), then a (+b) signal or a (−b) signal, respectively, is furnished depending on the sign of the change direction.

The disadvantage of this measurement method includes that in cases where the speed course exhibits a steep drop, and where the derivative of the speed, i.e. the acceleration jumps, then the threshold of the speed change ($\Delta v$) does not have to be reached completely at the point in time ($t_1$) even though, for a short time, a relatively high change of the speed can have occurred during the time duration ($\Delta t$). In this case, it can occur that a (+b) or (−b) signal is furnished, only when the reference duration $\Delta t$ has been passed through two times. This results in nonuniform automatic control amplitudes of the anti-lock device since the pressure decrease and the pressure build-up, respectively, occur with a time delay.

The German Patent DE 2,553,000-C2 to Hans Mueller et al. teaches an anti-lock automatic control system. The output signal of a time member (7) is fed to a monostable multivibrator (26). The monostable multivibrator in turn is connected to the brake pressure control device (22) and the multivibrator controls the brake pressure control device (22) depending on the switching signal such that, in each case, at the start of a period ($\Delta t$), there is initiated a pressure build-up of a time duration ($\Delta$) and that, in each case, in the following phase ($\Delta t-\Delta$) the pressure is maintained constant.

The German Printed Patent Document Laid Open DE-OS-3,906,680-A1 to Takashi Watanabe teaches a motor vehicle operating brake device. The device measures corresponding values of acceleration of the vehicle wheels and includes a digital low pass filter for obtaining acceleration values by excluding high frequency noise parts in following values from the momentary accelerations.

The German Printed Patent Document Laid Open DE-OS-3,841,956-A1 to Claus Beyer et al. teaches an anti-lock automatic control system, where the wheel slippage is employed. A reference signal is required where the slope of the reference signal is generated by an auxiliary reference signal. The slope is made dependent by the size of the pressure decrease during a control cycle and, in fact, the slope is decreased with an increasing pressure decrease.

The German Printed Patent Document Laid Open DE-OS 3,840,710-A1 to Haruki Simanuki et al. teaches an anti-lock control system for motor vehicles. The reference teaches that an anti-lock control system for motor vehicles is constructed such that in case the calculated vehicle speed along a reference delay gradient line, which is maintained over a predetermined acceleration successive limit of the calculated vehicle speed relative to the wheel speed for a certain time duration calculated from that point in time where the delay of the calculated vehicle wheel reaches for the first time the precedingly recited reference delay gradient line. After the motor vehicle has been braked, the calculated vehicle speed is modified such that it follows a deceleration gradient line with a gradient, where the gradient is smaller as compared to the reference deceleration gradient, which increases the threshold speed value.

The German Printed Patent Document Laid Open DE-OS 3,543,058 A1 to Hans-Wilhelm Bleckmann et al. teaches a method and switching circuit for the processing of the output signals of a rotation speed sensor. A use signal and a reference signal is generated for preparing the output signal of a rotation speed sensor, which generates an alternating voltage depending on the speed and on the amplitude of the rotation speed. The two signals are compared. Depending on the difference of the signals (11, 12,) a pulse-shaped output signal is furnished with the aid of a comparator (7), which output signal follows dynamically the use signal based on an adapter circuit.

The United Kingdom Patent Application GB 2,221,758-A to Toshio Yahagi et al. teaches an estimating speed of a vehicle equipped with anti-lock brakes. The deceleration of the vehicle is based on a differentiated value of a highest wheel speed of all wheels or, in a vehicle where the drive wheels are rigidly coupled, upon a differentiated value of a highest value of the wheel speed of the driven wheels, and the lowest wheel speed of the drive wheels. A speed estimating means compares the previous speed estimate with the present speed in a comparator and then operates a switch.

The U.S. Pat. No. 4,408,290 to Jun Kubo et al. teaches a method and device for determining the acceleration and/or deceleration of a moving object. An acceleration sensor is employed which acts on variable-frequency pulses of a speed sensor signal for recognizing any variation of the pulse period. The periods of groups are known and variable number pulse groups are measured with reference to a fixed-frequency clock pulse signal. The measurement periods of successive groups of equal numbers of pulses are compared. Where the difference between the pulse group period is zero or less than a predetermined value, the number of pulses in each group is increased in order to increase the total number of clock pulses during the measurement interval.

The U.S. Pat. No. 4,315,213 to Manfred Wolff teaches a method for obtaining an acceleration or deceleration signal from a signal proportional to speed as well as an apparatus for performing the method. The most recently ascertained n changes are stored in memory. If a new change is to be stored in memory, the longest stored change is erased and a deceleration or acceleration signal is formed by adding from the stored n changes, at intervals of ($\Delta t$).

SUMMARY OF THE INVENTION

1. Purposes of the Invention

It is an object of the present invention to furnish automatic control signals, which allow a quicker reaction to the speed changes.

It is a further object of the present invention to provide a method for stabilization and improved control of the behavior of commercial vehicles in acceleration and deceleration situations.

It is yet a further object of the present invention to individually control the wheels of a vehicle quickly and reliably in order to improve the driving behavior of the vehicles.

These and other objects and advantages of the present invention will become evident from the description which follows.

BRIEF DESCRIPTION OF THE INVENTION

According to the present invention there is provided for a method for the generation of wheel acceleration control signals and wheel deceleration control signals for an anti-lock system. An actually present wheel speed ($v_{wheel}$) is filtered for obtaining a wheel comparison speed signal. The wheel comparison speed ($v_{diff}$) follows to the actual wheel speed ($v_{wheel}$). The filtering is measured such that the filtered wheel comparison speed ($v_{diff}$) decreases with a maximum slope of from about $-0.6$ g to $-1.0$ g (g=gravity acceleration) in case of a wheel deceleration, and in case of a wheel acceleration increases with a maximum slope of from about $+0.3$ g to $+0.5$ g (g=gravity acceleration). The wheel comparison speed ($v_{diff}$) is calculated from the wheel comparison speed signal, obtained after filtering, with a microprocessor for monitoring the wheel behavior of one or several vehicle wheels. A deceleration signal ($-b$) and an acceleration signal ($+b$), respectively, are generated if the difference ($\Delta$) between the wheel comparison speed ($v_{diff}$) and the actual wheel speed ($v_{wheel}$) surpasses a preset value, surpasses a preset percentage of the wheel comparison speed ($v_{diff}$, or surpasses the sum of a predetermined speed value and of a predetermined percentage of the wheel comparison speed ($v_{diff}$).

The filtering of the wheel speed ($v_{wheel}$) can be dependent on an occurrence of a speed change signal ($-b$, $+b$) such that, during the occurrence of one of these control signals, the intensity of the filtering is decreased. The filter can be decreased such that the wheel comparison speed ($v_{diff}$) follows with a minimum slope of about $-1.6$ g and about $+0.4$ g, respectively, to the wheel speed ($v_{wheel}$) in case of an occurrence of a speed change signal ($-b$, $+b$).

The filtering can be further decreased in steps, if the difference ($\Delta$) between the wheel comparison speed ($v_{diff}$) and the wheel speed ($v_{wheel}$) surpasses a predetermined set distance value. The filtering can be increased in steps, if the distance between the wheel speed ($v_{wheel}$) and the wheel comparison speed ($v_{diff}$) is contained within the set point distance. The decrease can be performed involving larger steps as compared to the steps occurring in connection with an increase.

The wheel comparison speed ($v_{diff}$) can be set to a set point distance relative to the wheel speed ($v_{wheel}$) in case of a surpassing of predetermined differences between the wheel speed ($v_{wheel}$) and the wheel comparison speed ($v_{diff}$).

The set point distance can amount to about 2 km per hour.

A deceleration signal ($-b$) or an acceleration signal ($+b$) can be delivered quicker as compared with the method of the state of the art by the generation of a wheel comparison speed ($v_{diff}$) and the constant evaluation of the distance ($\Delta$) between the comparison speed ($v_{diff}$) and the wheel speed ($v_{wheel}$).

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invent i on.

DESCRIPTION OF INVENTION AND PREFERRED EMBODIMENT

According to the present invention, there is provided for a method for the generation of wheel acceleration control signals and wheel deceleration control signals for an anti-lock system, including at least a microprocessor, which monitors the wheel behavior of one or several vehicle wheels. A wheel comparison speed $v_{diff}$ is calculated by the microprocessor. The wheel comparison speed $v_{diff}$ is obtained by a filtering of the actually present wheel speed $v_{wheel}$ and the wheel comparison speed $v_{diff}$ follows to the actual wheel speed $v_{wheel}$. The filtering is performed such that the filtered wheel comparison speed $v_{diff}$ decreases with a maximum slope of from about −0.6 g to −1.0 g (g=gravity acceleration) in case of a wheel deceleration, and in case of a wheel acceleration increases with a maximum slope of from about +0.3 g to +0.5 g (g=gravity acceleration). A deceleration signal −b and an acceleration signal +b, respectively, is generated where the difference Δ between the wheel comparison speed $v_{diff}$ and the actual wheel speed $v_{wheel}$ surpasses a preset value or surpasses a preset percentage of the wheel comparison speed $v_{diff}$, or surpasses the sum of a predetermined speed value and of a predetermined percentage of the wheel comparison speed $v_{diff}$.

The filtering of the wheel speed $v_{wheel}$ can be dependent on an occurrence of a deceleration signal −b or of an acceleration signal +b such that during the occurrence of one of these control signals, the filtering is decreased. In case of the occurrence of a deceleration signal −b or in case of the occurrence of an acceleration signal +b, the filtering is decreased such that the wheel comparison speed $v_{diff}$ follows with a minimum slope of about −1.6 g and about +0.4 g, respectively, to the wheel speed $v_{wheel}$.

The filtering can be further decreased in steps, if the difference Δ between the wheel comparison speed $v_{diff}$ and the wheel speed $v_{wheel}$ surpasses a predetermined set distance value. The filtering can be increased in steps, if the distance between the wheel speed $v_{wheel}$ and the wheel comparison speed $v_{diff}$ is contained within the set point distance.

The decrease can be performed involving larger steps as compared to the steps occurring in connection with an increase.

The wheel comparison speed $v_{diff}$ can be set to the set point distance relative to the wheel speed $v_{wheel}$ in case of a surpassing of predetermined differences between the wheel speed $v_{wheel}$ and the wheel comparison speed $v_{diff}$.

The set point distance can amount to about 2 km per hour.

Figure 1:
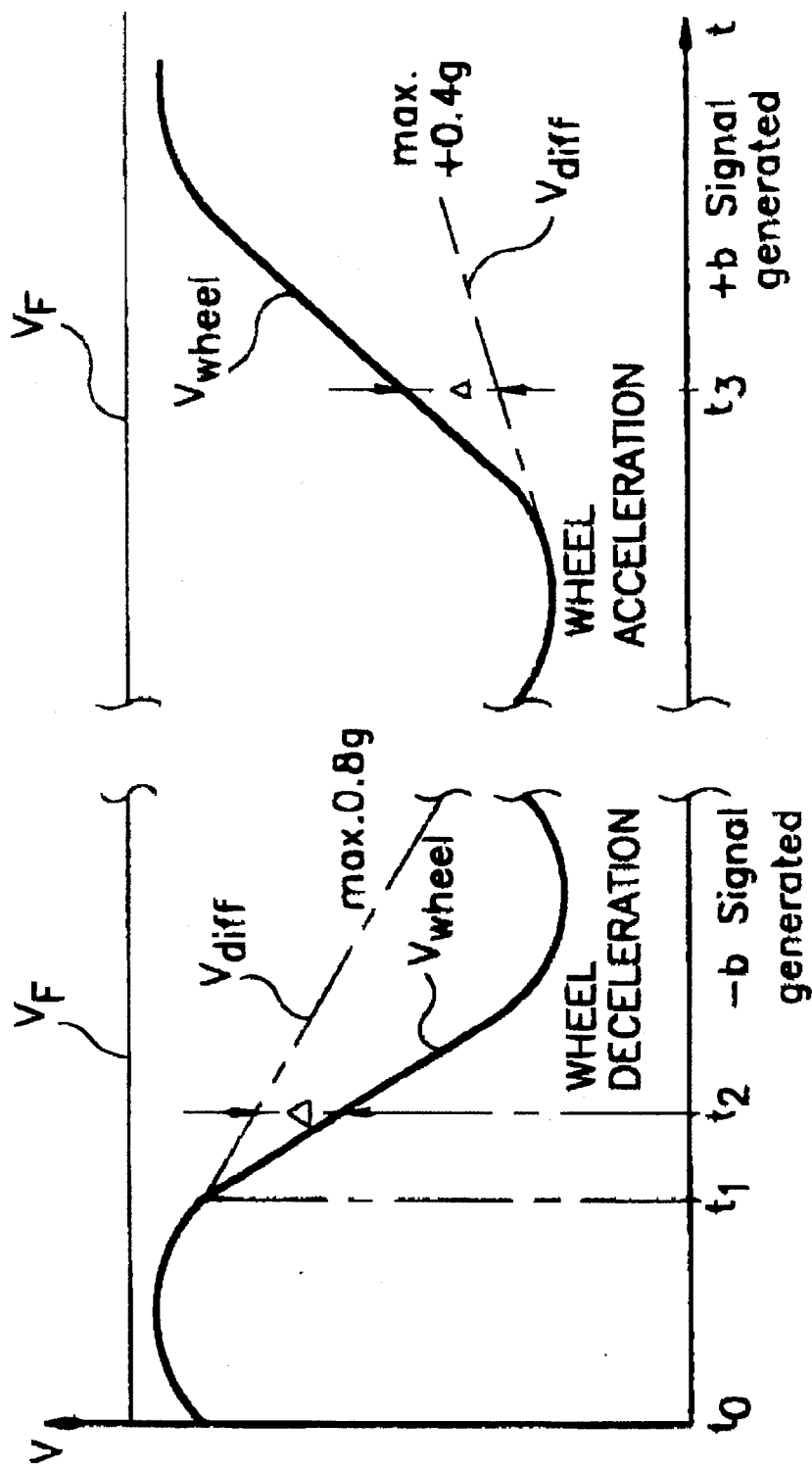
FIG. 1 is a view of a schematic diagram illustrating the speed plotted as ordinate and the time plotted as abscissa for the rotation of a wheel of a vehicle.

The vehicle reference speed $v_F$, the wheel speed $v_{wheel}$ and the comparison speed $v_{diff}$ is plotted relative to a course of time t in FIG. 1.

The comparison speed $v_{diff}$ is the filtered wheel speed. As long as the wheel does not experience excessive speed changes, the value of the comparison speed $v_{diff}$ is approximately equal to the wheel speed $v_{wheel}$ for the time period $t_0$ through $t_1$ and the difference Δ is therefore about zero, As soon as the difference Δ between the wheel speed $v_{wheel}$ and the comparison speed $v_{diff}$ surpasses a certain limit value, then, depending on the direction of the difference value, there is furnished a −b signal, shown in the left half of the drawing of FIG. 1 at the point in time $t_2$, or a +b signal illustrated on the right half of FIG. 1 at a point in time $t_3$.

Maximum possible slopes of the comparison speed $v_{diff}$, without generated automatic control signals, are selected advantageously by way of maximum physically possible vehicle accelerations and vehicle deceleration, respectively. These maximum possible slopes can therefore be different depending on the vehicle type.

Figure 4A:
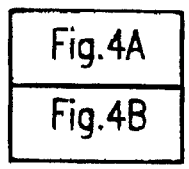
FIG. 4 comprising of FIG. 4A and FIG. 4B, is a view of a flow diagram for generating ($+b$) or ($-b$) signals.
Figure 4A:
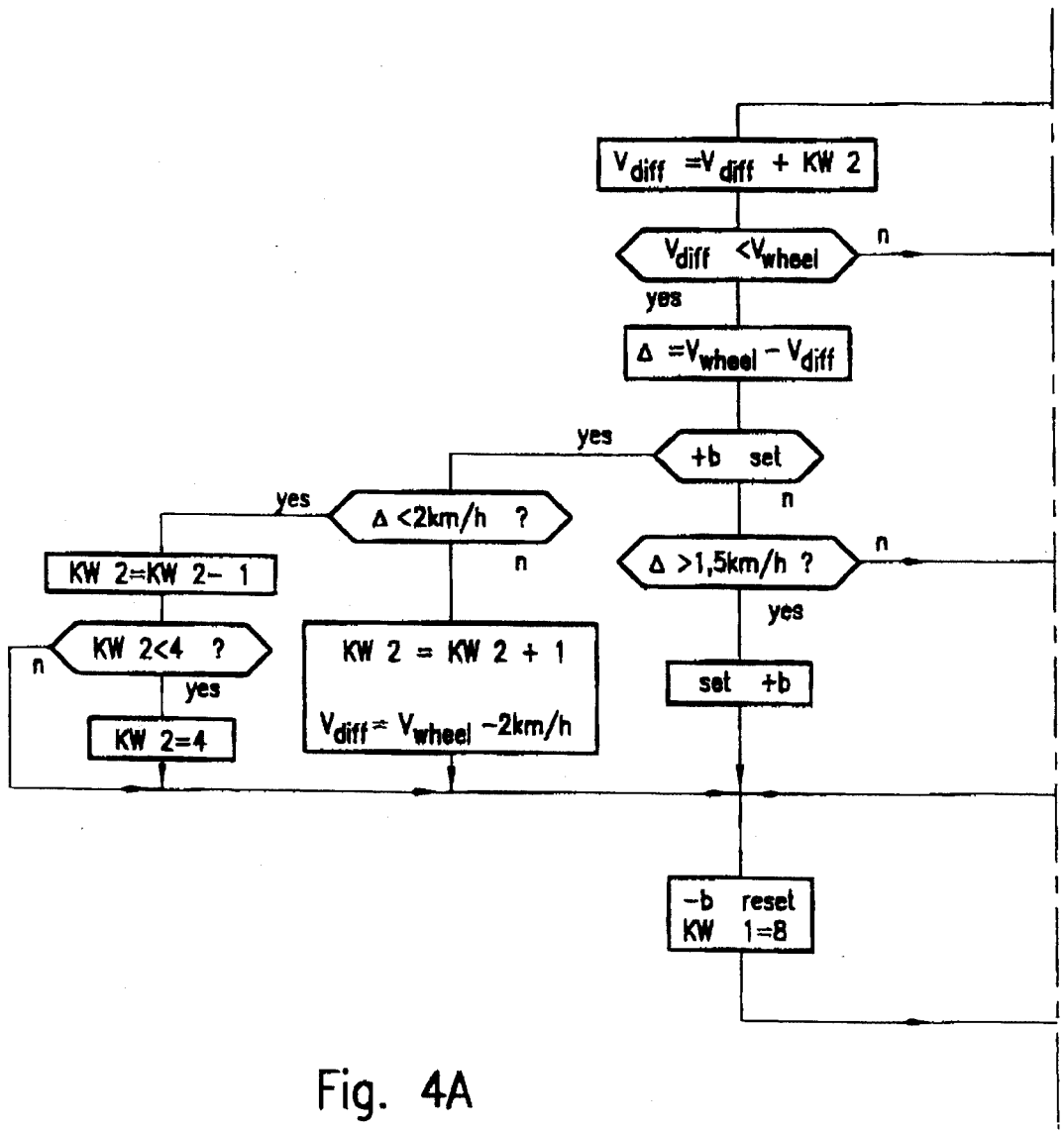
Figure 4B:
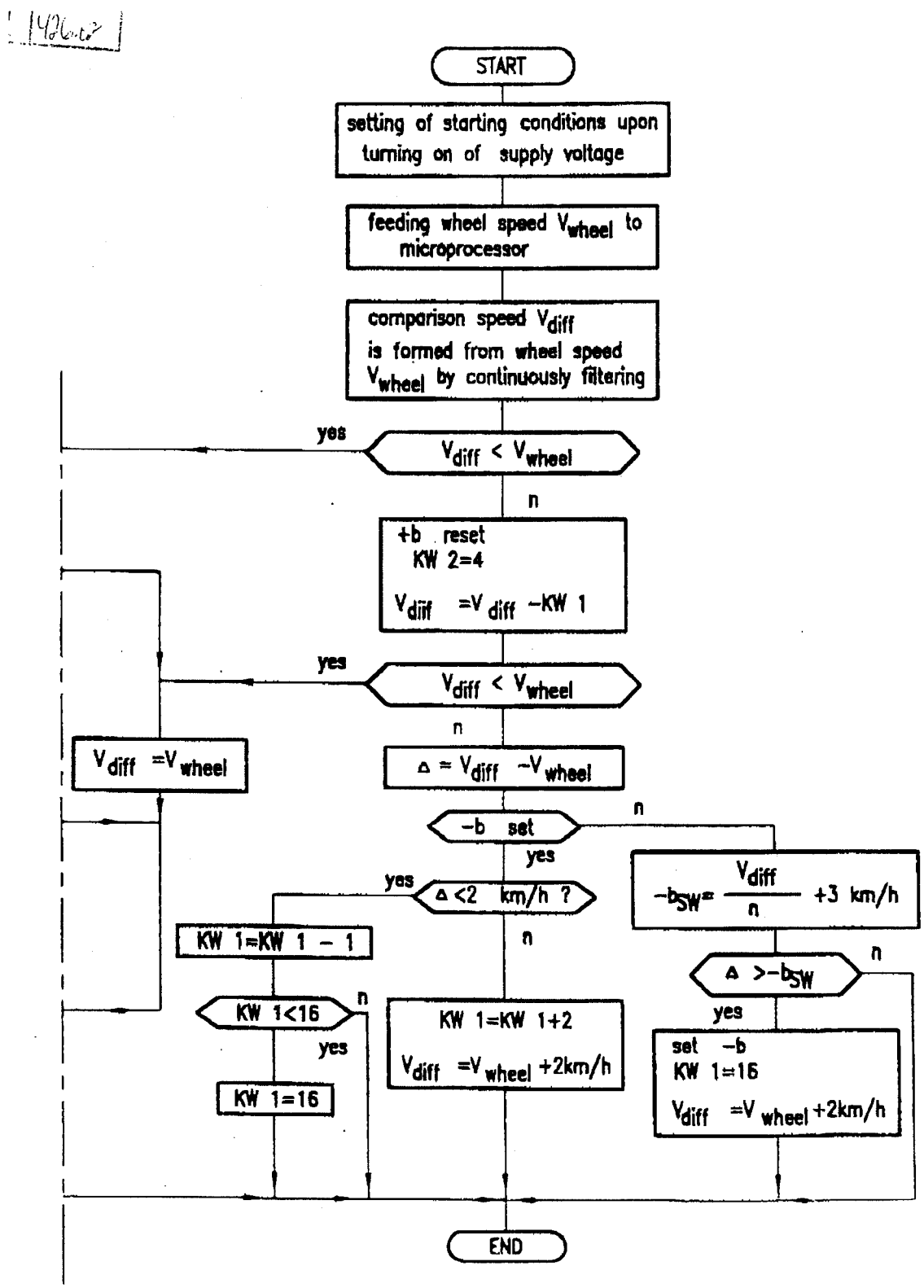

The slope of the wheel comparison speed $v_{diff}$ is recalculated during each passage of the flow diagram, as illustrated in FIG. 4.

Figure 3:
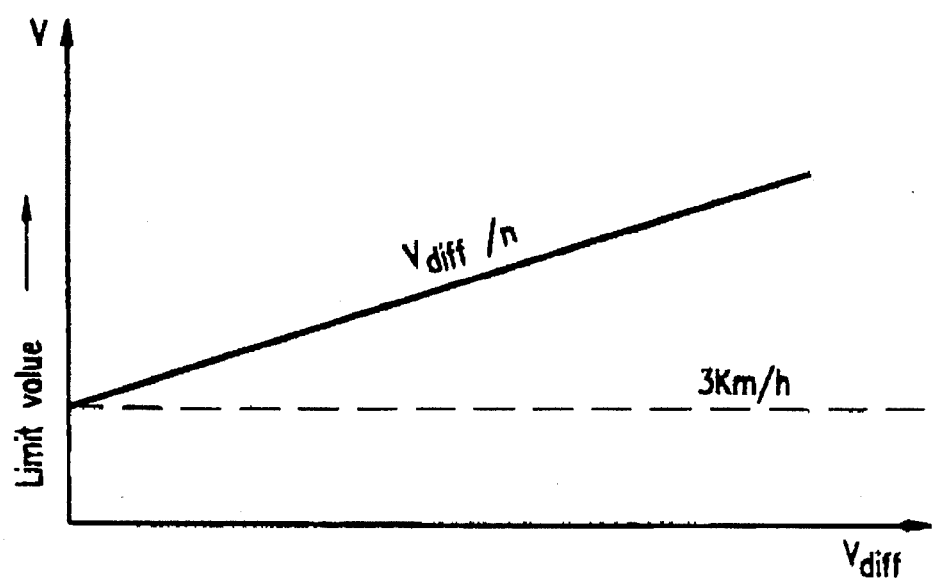
FIG. 3 is a view of a diagram illustrating the formation of the limit value, such that the difference $\Delta$ can be compared with the limiting value.

Similarly, the limit value, to which the difference Δ is compared, is recalculated during each passage. It is advantageous in this context to form the limit value for the formation of the deceleration signals −b based on the sum of an absolute speed value, for example, 3 km per hour, and of a fraction of the comparison speed, for example, comparison speed $v_{diff}/n$, where n is a value such as 1, 2, 3, as indicated in FIG. 3.

Such procedure is associated with the following advantage in connection with the slope of the comparison speed $v_{diff}$, which comparison speed $v_{diff}$ is disposed within a region of physically possible decelerations:

In case of automatically controlled braking processes with a high frictional value and with a loaded vehicle, a high pressure is necessary in the wheel brake cylinders in order to allow the wheel at all to become unstable, i.e. to lock the wheel. Since, however, no high brake force excess is present in standard vehicles based on economic considerations, the wheel runs with a markedly smaller deceleration than normal into the slippage, and a so-called creeping lockage occurs. Based on the relatively low slope and deceleration, respectively, of the comparison speed $v_{diff}$, there results an early response of the −b signal, i.e. still below the otherwise usual difference thresholds of 1.2 to 2 g, where g is the acceleration corresponding to the gravity of the earth.

Figure 2:
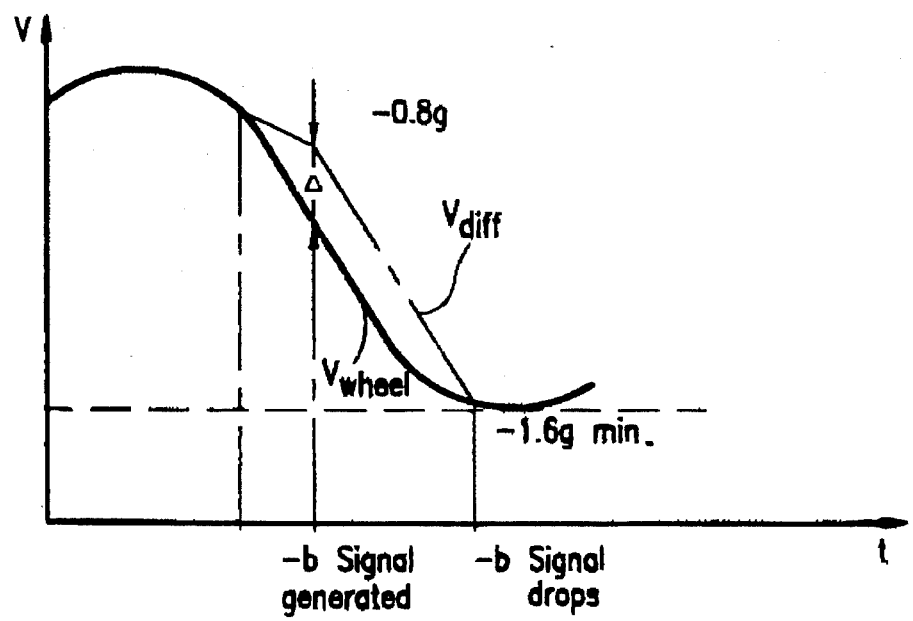
FIG. 2 is a view of a diagram similar to that of FIG. 1, however with the entry of a modified comparison speed.

As is illustrated in FIG. 2, it is further possible and advantageous to change the amount of the slope of the comparison speed $v_{diff}$ in case of an occurrence of a delay signal −b. According to the example illustrated, the slope is increased from about −0.8 g to −1.6 g, where g is the gravity acceleration. This is associated with the advantage that the comparison speed $v_{diff}$ approaches approximately the value of the wheel speed $v_{wheel}$ and allows a more rapid, renewed decrease of the respective automatic control signal. A further approach occurs via correction values KW1, KW2, which are indicated in FIG. 4, and which also have the object to allow a rapid and early decrease of the automatic control signals ±b at the earliest possible time. A deceleration signal and an acceleration signal are called in this context a speed change signal.

The accurate mode of generation of the ±b signals as well as the adaptation of the comparison speed $v_{diff}$ and of the limit value can be illustrated most conveniently by way of the flow diagram illustrated in FIG. 4. This flow diagram is part of a program loop of a microprocessor, such as is known, for example, from the German Printed Patent Laid Out DE-A-2,8444,279.7. The main program serves in this case for the generation of control signals for the solenoid control valves for influencing the wheel brake pressures in case of an anti-lock system. The loop passage time amounts to about 2 milliseconds according to a preferred embodiment.

The comparison speed $v_{diff}$ is formed from the wheel speed $v_{wheel}$ by calculating a new value $v_{diff}$ depending on the sign of the difference between the value for the comparison speed $v_{diff}$ calculated during the last passage of the loop and the actual wheel speed, wherein the old value is increased by a correction value KW2 or, respectively, is decreased by a correction value KW1. If this correction results in a change in sign, then $v_{diff}$ is set to the value of $v_{wheel}$.

The deceleration signal −b is then furnished and set, where a predetermined difference Δ between the comparison speed $v_{diff}$ and the wheel speed $v_{wheel}$ occurs and is surpassed, respectively.

In case of a set automatic control signal ±b, the correction value KW is increased, if the distance between $v_{diff}$ and $v_{wheel}$ surpasses a predetermined difference Δ, as a set distance value, or is decreased in case of falling below a certain value, respectively, wherein a predetermined minimum value cannot be passed.

The limiting of the distance represents a predeterminable drop delay deceleration, with the object to let the automatic control signal operate for a minimum time duration and to allow small variations of the measured wheel speed without switching off the automatic control signal such that hysteresis is avoided.

The flow diagram can be passed through along different paths. The automatic control signals ±b are switched on and set or, respectively, switched off and reset. The values for the wheel speed $v_{wheel}$ correspond to the measured wheel speed. The measured wheel speed is captured by the wheel sensors, as described above.

The right-hand side of the flow diagram serves for the generation of a deceleration signal −b and the left-hand side of the flow diagram serves for the generation of an acceleration signal +b.

Upon turning on the supply voltage during a starting of the vehicle, there are set suitable initial values for the comparison speed $v_{diff}$, the wheel speed $v_{wheel}$, the correction value KW1, and the correction value KW2. The program of the anti-locking device runs continuously during driving, i.e. also during the time periods where the vehicle is not subjected to brake action.

Amongst others, the following program steps occur in this context.

Inquiry if the comparison speed $v_{diff}$<the wheel speed $v_{wheel}$.

If no: extinguishing of a possibly present +b signal, setting of the correction value KW2 to the value 4 and formation of a new difference, comparison speed $v_{diff} = v_{diff}^{(alt)} - KW1$.

Inquiry if the comparison speed $v_{diff}$ is still smaller than the wheel speed $v_{wheel}$.

If no: Formation of the difference $\Delta = v_{diff} - v_{wheel}$.

Inquiry if a deceleration signal −b has been set.

If yes: Inquiry if $\Delta$<2 km/hr.

If no: Setting the set point distance of the comparison speed $v_{diff}$=the speed $v_{wheel}$+2 km/hr and increasing the correction value KW1=KW1+2.

The comparison speed $v_{diff}$ is thus fixed by a fixed value relative to the wheel speed $v_{wheel}$. This ends this branch of the flow diagram.

If −b had not been set, then a value $-b_{SW}$= respectively, $v_{wheel} = v_{diff}/n+3$ km/hr.

In the following, it is inquired if $\Delta > -b_{SW}$, if no: end of the process.

If yes: An output signal −b is set, the correction value KW1 is increased to 16, and a comparison speed $v_{diff}$ is set to the value $v_{diff} = v_{wheel} + 2$ km/hr. This generates a break point or knee in the course of the comparison speed $v_{diff}$. This is followed by the end of the flow inquiry procedure.

If the inquiry $\Delta$<2 km/hr is answered in the affirmative, then the correction value KW1 is decreased by 1.

In the following, the correction value 1 is limited to a maximum value of 16.

If the preceding inquiry, whether $v_{diff}$ is $<v_{wheel}$ after subtraction of the correction value, is affirmatively answered, then at least the comparison speed $v_{diff}$ is set to the value wheel speed $v_{wheel}$.

The left side of the flow diagram is considered in cases where the inquiry, comparison speed $v_{diff}$<wheel speed $v_{wheel}$, is affirmed. It follows from this that a deceleration could be present. Then, initially the comparison speed is brought closer to the wheel speed: $v_{diff} = v_{diff} + KW2$.

Then, the following program steps are performed:

Inquiry if comparison speed $v_{diff}$<wheel speed $v_{wheel}$.

If yes: setting $\Delta = v_{wheel} - v_{diff}$.

If an acceleration signal +b has not yet been set, then there is inquired in the following if $\Delta$ is <1.5 km/hr.

If $\Delta$<1.5 km/hr, then the acceleration signal +b is set.

In the following, a possibly present −b signal is cancelled and the correction value KW1 is set to 8. This terminates this path of the flow diagram of FIG. 4.

If the inquiry, comparison speed $v_{diff}$<wheel speed $v_{wheel}$ results in a no, then $v_{diff} = v_{wheel}$ is set.

If the inquiry, +b already set, results in a yes answer, then it is inquired if $\Delta$<2 km/hr. If no, the value KW2 is set to KW2+1 and the comparison speed $v_{diff}$ is set to a value of $v_{wheel} - 2$ km/hr.

If the inquiry $\Delta$<2 km/hr results in a yes, then the correction value KW2=KW2−1 is set and in the following, the value for the correction value KW2 is set to at least 4.

This describes all different paths of the flow diagram to be run through. Of course, this can be modified without leaving the scope of the invention claims.

The invention method for the generation of automatic control signals results in a particularly comfortable and adaptive automatic control of moving vehicles.

It will be understood that each of the elements described above, or two or more together, may also find a useful application in other types of signal generation systems and automatic control systems differing from the types described above.

While the invention has been illustrated and described as embodied in the context of a method for generating wheel acceleration control signals and wheel deceleration control signals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for generating wheel acceleration control signals and wheel deceleration control signals for an antilock control system comprising the following steps:

continuously filtering a current wheel speed ($v_{wheel}$) during operation of the wheel for obtaining by a microprocessor a wheel comparison speed ($v_{diff}$) for indicating a difference between the current wheel speed and a previous wheel speed, wherein the wheel comparison speed ($v_{diff}$) is filtered from the wheel speed ($v_{wheel}$), and wherein the filtered wheel comparison speed ($v_{diff}$) decreases with a maximum slope of a constant first preset value of from −0.6 g to −1.0 g (g=gravity acceleration) in case of a wheel deceleration, and in case of a wheel acceleration increases with a maximum slope of a constant second preset value of from +0.3 g to +0.5 g (g=gravity acceleration); generating a deceleration signal (−b) when a difference ($\Delta$) between the wheel comparison speed ($v_{diff}$) and the current wheel speed ($v_{wheel}$) surpasses a third preset value; generating an acceleration signal (+b) when a difference ($\Delta$) between the current wheel speed ($v_{wheel}$) and the wheel comparison speed ($v_{diff}$) surpasses a fourth preset value;

and supplying the generated deceleration signal and the generated acceleration signal to the anti-lock control system for controlling wheel behavior.

2. The method according to claim 1, wherein the filtering of the wheel speed ($v_{wheel}$) is dependent on an occurrence of the deceleration signal (−b) such that, during an occurrence of the deceleration signal (−b), the intensity of the filtering action is decreased, and wherein the filtering of the wheel speed ($v_{wheel}$) is dependent on an occurrence of the acceleration signal (+b) such that, during the occurrence of the acceleration signal (+b), the intensity of the filtering action is decreased;

and further comprising decreasing the filtering action such that the wheel comparison speed ($v_{diff}$) follows with a slope of a minimum value of about −1.6 g to the wheel speed ($v_{wheel}$) in case of the occurrence of the deceleration signal (−b) and such that the wheel comparison speed ($v_{diff}$) follows with a slope of a minimum value of about +0.4 g to the wheel speed ($v_{wheel}$) in case of the occurrence of the acceleration signal (+b);

setting the wheel comparison speed ($v_{diff}$) to a predetermined difference value relative to the wheel speed ($v_{wheel}$) in case of a surpassing of a predetermined difference value for a difference between the wheel speed ($v_{wheel}$) and the wheel comparison speed ($v_{diff}$), wherein the predetermined distance value amounts to about 2 km per hour; further decreasing the filtering action in steps, if the difference (Δ) between the wheel comparison speed ($v_{diff}$) and the wheel speed ($v_{wheel}$) surpasses the predetermined difference value; increasing the filtering action in steps, if the distance between the wheel speed ($v_{wheel}$) and the wheel comparison speed ($v_{diff}$) is contained within the predetermined difference value;

wherein the decreasing of the filtering action is performed involving larger steps as compared to the steps occurring in connection with the increasing of the filtering action.

3. The method according to claim 1, wherein the filtering of the wheel speed ($v_{wheel}$) is dependent on an occurrence of the deceleration signal (−b) such that, during an occurrence of the deceleration signal (−b), the intensity of the filtering action is decreased, and wherein the filtering of the wheel speed ($v_{wheel}$) is dependent on an occurrence of the acceleration signal (+b) such that, during the occurrence of the acceleration signal (+b), the intensity of the filtering action is decreased.

4. The method according to claim 3, further comprising decreasing the filtering action such that the wheel comparison speed ($v_{diff}$) follows with a minimum slope of about −1.6 g and about +0.4 g, respectively, to the wheel speed ($v_{wheel}$) in case of an occurrence of a speed change signal (−b, +b).

5. The method according to claim 3, further comprising further decreasing the filtering action in steps, if the difference (a) between the wheel comparison speed ($v_{diff}$) and the wheel speed ($v_{wheel}$) surpasses a predetermined difference value.

6. The method according to claim 5, further comprising increasing the filtering action in steps over time, if the difference between the wheel speed ($v_{wheel}$) and the wheel comparison speed ($v_{diff}$) is contained within the predetermined difference value.

7. The method according to claim 5, wherein the decrease of the filtering action is performed involving larger steps as compared to the steps occurring in connection with an increase of the filtering action.

8. The method according to claim 5, further comprising setting the wheel comparison speed ($v_{diff}$) to a a sum of the predetermined difference value and of the wheel speed ($v_{wheel}$) in case of a surpassing of the predetermined difference value for a difference between the wheel speed ($v_{wheel}$) and the wheel comparison speed ($v_{diff}$).

9. The method according to claim 5, wherein the predetermined difference value amounts to about 2 km per hour.

10. A method for generating wheel acceleration control signals and wheel deceleration control signals for an anti-lock control system comprising the following steps:

continuously filtering a current wheel speed ($v_{wheel}$) for obtaining a wheel comparison speed ($v_{diff}$) for indicating a difference between the current wheel speed and a previous wheel speed, wherein the wheel comparison speed ($v_{diff}$) is filtered from the wheel speed ($v_{wheel}$), and wherein the filtered wheel comparison speed ($v_{diff}$) decreases with a slope of a constant first preset value of from −0.6 g to −1.0 g (g= gravity acceleration) in case of a wheel deceleration and in case of a wheel acceleration increases with a slope of a constant second preset value of from +0.3 g to +0.5 g (g= gravity acceleration); generating a deceleration signal (−b) when a difference (Δ) between the wheel comparison speed ($v_{diff}$) and the current wheel speed ($v_{wheel}$) surpasses a third preset percentage value of the wheel comparison speed ($v_{diff}$);

generating an acceleration signal (+b) when the difference (Δ) between the current wheel speed ($v_{wheel}$) and the wheel comparison speed ($v_{diff}$) surpasses a fourth preset percentage value of the wheel comparison speed ($v_{diff}$); and supplying the generated deceleration signal and the generated acceleration signal to the anti-lock control system for controlling wheel behavior.

11. A method for generating wheel acceleration control signals and wheel deceleration control signals for an anti-lock control system comprising the following steps:

continuously filtering a current wheel speed ($v_{wheel}$) for obtaining a wheel comparison speed ($v_{diff}$) for indicating a difference between the current wheel speed and a previous wheel speed, wherein the wheel comparison speed ($v_{diff}$) is filtered from the wheel speed ($v_{wheel}$);

delimiting the filtering such that the filtered wheel comparison speed ($v_{diff}$) decreases with a slope of a constant first preset value of from −0.6 g to −1.0 g (g= gravity acceleration) in case of a wheel deceleration; delimiting the filtering such that the filtered wheel comparison speed ($v_{diff}$) increases with a slope of a constant second preset value of from +0.3 g to +0.5 g (g= gravity acceleration) in case of a wheel acceleration; generating a deceleration signal (−b) when a difference between the wheel comparison speed ($v_{diff}$) and the current wheel speed ($v_{wheel}$) surpasses the sum of a third predetermined speed value and of a fourth predetermined percentage value of the wheel comparison speed ($v_{diff}$); generating an acceleration signal (+b) when the difference (Δ) between the wheel comparison speed ($v_{diff}$) and the current wheel speed ($v_{wheel}$) surpasses the sum of a fifth predetermined speed value and of a sixth predetermined percentage value of the wheel comparison speed ($v_{diff}$); and supplying the generated deceleration signal and the generated acceleration signal to the anti-lock control system for controlling wheel behavior.

12. Method for generating wheel acceleration control signals and wheel deceleration control signals for an anti-lock control system, including at least a microprocessor, which monitors the wheel behavior of one or several vehicle wheels, wherein a) a wheel comparison speed ($v_{diff}$) is calculated by the microprocessor, which wheel comparison speed ($v_{diff}$) is obtained by continuously filtering the current wheel speed ($v_{wheel}$) for indicating a difference between the current wheel speed and a previous wheel speed, and which wheel comparison speed ($v_{diff}$) is filtered from the wheel speed ($v_{wheel}$);

b) the filtering decreases the filtered wheel comparison speed ($v_{diff}$) with a maximum slope of a first preset value of from −0.6 g to −1.0 g (g=gravity acceleration) in case of a wheel deceleration, and in case of a wheel acceleration increases with a maximum slope of a second preset value of from +0.3 g to +0.5 g (g=gravity acceleration);

c) a deceleration signal (−b) is generated where a difference (Δ) between the wheel comparison speed ($v_{diff}$) and the current wheel speed ($v_{wheel}$) surpasses a third preset value;

d) an acceleration signal (+b) is generated where a difference (Δ) between the wheel comparison speed ($v_{diff}$) and the current wheel speed ($v_{wheel}$) surpasses the third preset value;

e) supplying the generated deceleration signal and the generated acceleration signal to the anti-lock control system for controlling wheel behavior.

13. The method according to claim 12, wherein the filtering of the wheel speed ($v_{wheel}$) is dependent on an occurrence of a deceleration signal (−b) or of an acceleration signal (+b) such that during the occurrence of one of these control signals, the filtering action is decreased.

14. The method according to claim 13, wherein, in case of the occurrence of a deceleration signal (−b) or in case of the occurrence of an acceleration signal (+b), the filtering action is decreased such that the wheel comparison speed ($v_{diff}$) follows with a minimum slope of about −1.6 g and about +0.4 g, respectively, to the wheel speed ($v_{wheel}$).

15. The method according to claim 13, wherein the filtering action is further decreased in steps, if the difference (Δ) between the wheel comparison speed ($v_{diff}$) and the wheel speed ($v_{wheel}$) surpasses a predetermined difference value.

16. The method according to claim 15, wherein the filtering action is increased in steps, if the distance between the wheel speed ($v_{wheel}$) and the wheel comparison speed ($v_{diff}$) is contained within the predetermined difference value.

17. The method according to claim 15, wherein the decrease of the filtering action is performed involving larger steps as compared to the steps occurring in connection with an increase of the filtering action.

18. The method according to claim 15, wherein the wheel comparison speed ($v_{diff}$) is set to the predetermined difference value relative to the wheel speed ($v_{wheel}$) in case of a surpassing of the predetermined difference value for a difference between the wheel speed ($v_{wheel}$) and the wheel comparison speed ($v_{diff}$).

19. The method according to claim 14, wherein the predetermined difference value amounts to about 2 km per hour.

20. A method for generating wheel acceleration control signals and wheel deceleration control signals for an anti-lock control system comprising the following steps:

setting initial values for a wheel speed ($v_{wheel}$) and for a wheel comparison speed ($v_{diff}$);

monitoring a wheel behavior for setting the current wheel speed ($v_{wheel}$);

calculating the wheel comparison speed ($v_{diff}$) based on the current wheel speed ($v_{wheel}$) and a previous wheel speed, wherein the wheel comparison speed ($v_{diff}$) continuously is filtered from the wheel speed ($v_{wheel}$);

decreasing the wheel comparison speed ($v_{diff}$) with a maximum slope of a constant first preset value of from −0.6 g to −1.0 g (g=gravity acceleration) in case of a wheel deceleration exceeding −0.6 g to −1.0 g (g=gravity acceleration);

generating a deceleration signal when a difference (Δ) between the wheel comparison speed ($v_{diff}$) and the current wheel speed ($v_{wheel}$) surpasses a third preset value; supplying the generated deceleration signal to the anti-lock control system for controlling the wheel behavior;

increasing the wheel comparison speed ($v_{diff}$) with a maximum slope of a constant second preset value of from +0.3 g to +0.5 g (g=gravity acceleration) in case of the wheel acceleration exceeding +0.3 g to +0.5 g;

generating an acceleration signal when the difference (Δ) between the current wheel speed ($v_{wheel}$) and the wheel comparison speed ($v_{diff}$) surpasses a fourth preset value;

supplying the generated acceleration signal to the anti-lock control system for controlling the wheel behavior;

maintaining the wheel comparison speed ($v_{diff}$) generally equal to the wheel speed ($v_{wheel}$) if an absolute amount of a wheel deceleration is smaller than 0.6 g (g=gravity acceleration) and if an absolute amount of a wheel acceleration is smaller than 0.3 g (g=gravity acceleration) and if a prior deviation of the wheel comparison speed ($v_{diff}$) from the wheel speed ($v_{wheel}$) has receded.

\* \* \* \* \*